United States Patent [19]

Uttley

[11] Patent Number: 5,018,931
[45] Date of Patent: May 28, 1991

[54] METHOD AND APPARATUS FOR HANDLING INFANT TRANSPORT INCUBATORS

[75] Inventor: Derek Uttley, Nepean, Canada

[73] Assignee: Children's Hospital of Eastern Ontario, Ontario, Canada

[21] Appl. No.: 409,395

[22] Filed: Sep. 19, 1989

[30] Foreign Application Priority Data

Jul. 26, 1989 [CA] Canada .................................. 606723

[51] Int. Cl.⁵ ............................................ B65G 67/02
[52] U.S. Cl. ..................................... 414/495; 5/81 B; 188/5; 296/20; 414/347; 414/498; 414/537; 414/786
[58] Field of Search ............... 414/341, 343, 347, 495, 414/498, 786, 537, 259, 260, 917, 921; 296/20; 254/9 C, 122; 5/81 B, 81 C, 81 R, 86; 188/5

[56] References Cited

U.S. PATENT DOCUMENTS

| | | | |
|---|---|---|---|
| 1,138,582 | 5/1915 | Sleicher | 296/20 |
| 2,691,450 | 10/1954 | Rosenbaum | 414/343 |
| 3,392,410 | 7/1968 | Grahn | 5/86 X |
| 3,623,617 | 11/1971 | Nemessanyi | 414/495 X |
| 4,019,772 | 4/1977 | Lee | 296/20 |
| 4,092,748 | 6/1978 | Ewers | 5/85 |
| 4,097,941 | 7/1978 | Merkel | 296/20 X |
| 4,148,404 | 4/1979 | Heisler | 414/280 X |
| 4,221,211 | 9/1980 | Brasch | 5/81 R X |
| 4,222,132 | 9/1980 | Crim et al. | 5/81 C X |
| 4,290,728 | 9/1981 | Leduc | 414/537 |
| 4,302,145 | 11/1981 | Heisler | 414/537 X |
| 4,573,663 | 3/1986 | Nussbaum | 254/122 X |
| 4,655,466 | 4/1987 | Hanaska | 254/9 C X |
| 4,858,888 | 8/1989 | Cruz et al. | 254/122 |

FOREIGN PATENT DOCUMENTS 2092077 8/1982 United Kingdom ................ 5/81 R

Primary Examiner—David A. Bucci
Attorney, Agent, or Firm—Price, Heneveld, Cooper, DeWitt & Litton

[57] ABSTRACT

Apparatus for handling transport incubators for infants and adaptable for handling any hospital patient conveyance having a wheeled base. The apparatus includes a carrier having a wheeled undercarriage, a hoistable elevator platform affixed to the undercarriage and a handle for steering and propelling the carrier. The undercarriage and the elevator platform are interconnected by a pair of cross-linked X-shaped lazy tongs that are interconnected by a cross member that is connected to the ram of a hydraulic cylinder for raising and lowering the elevator platform. The elevator platform is provided with a loading guide and locking mechanism to ensure that a patient conveyance cannot be inadvertently disembarked therefrom. A brake mechanism is also provided on the wheeled undercarriage to prevent unintentional movement thereof. The apparatus is used for moving heavy or heavily laden patient conveyances to and from ambulances of other raised surfaces.

4 Claims, 4 Drawing Sheets

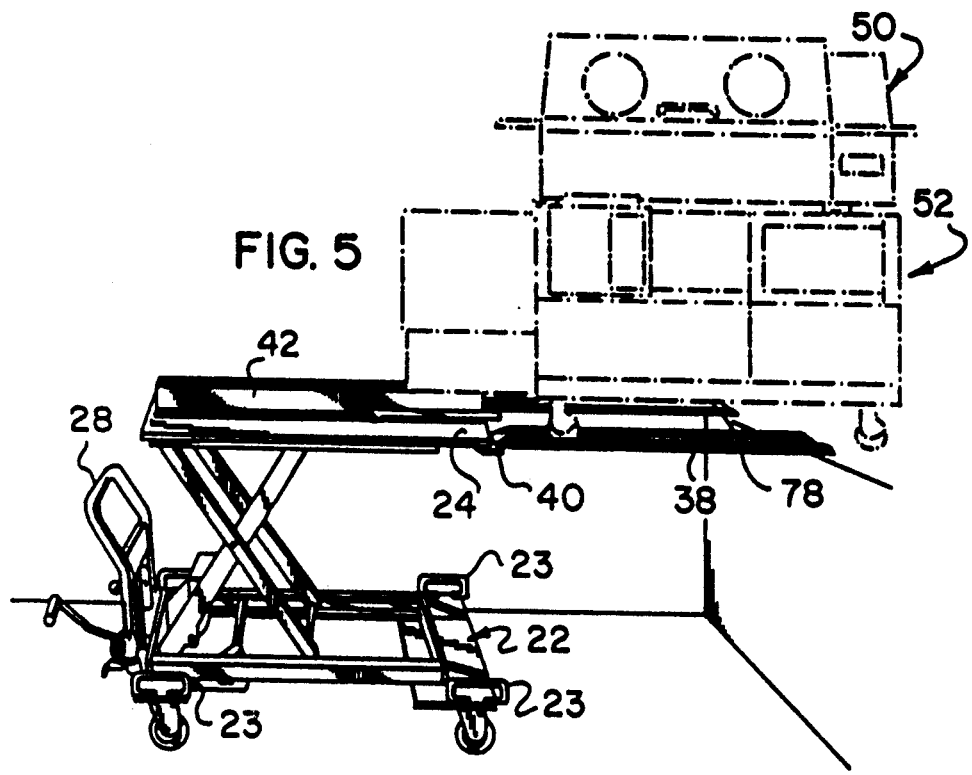
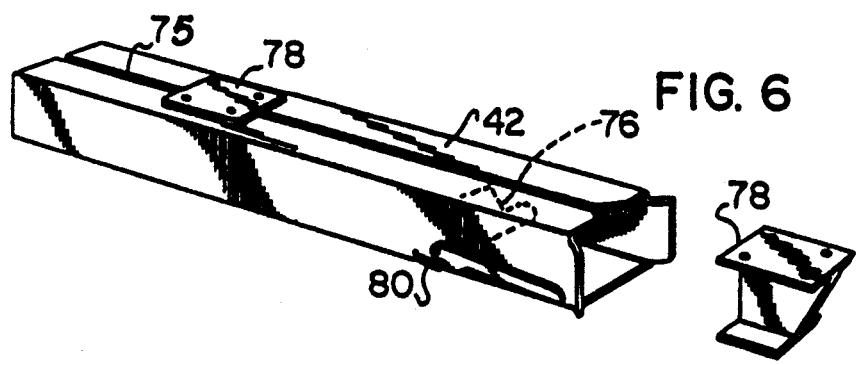
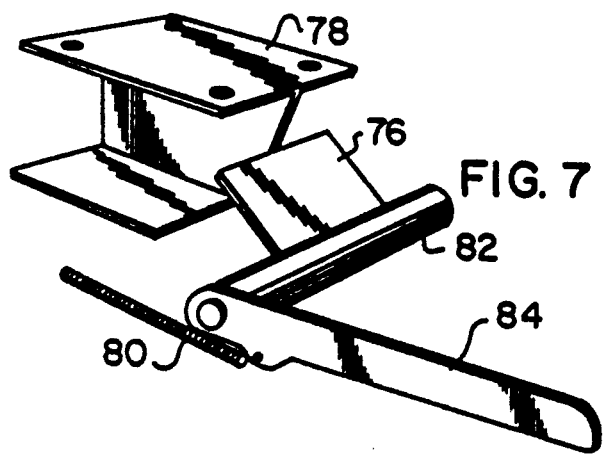

METHOD AND APPARATUS FOR HANDLING INFANT TRANSPORT INCUBATORS

The present invention relates to apparatus for handling health care patients and, in particular, to a method and apparatus for handling transport incubators for infants.

BACKGROUND OF THE INVENTION

Transport incubators represent an advance in infant health care equipment for the care of infant patients. Transport incubators typically include an infant incubator provided with a wheeled base which is equipped with life support and monitoring instrumentation, oxygen tanks and other emergency care supplies. Transport incubators are used for moving ill or injured infants to hospital and have proven valuable in sustaining the lives of infants during transport, however, the use of transport incubators is not without problems. Their weight and inherent unwieldiness render them difficult to load and unload from an ambulance. Transport incubators having wheeled bases equipped with life support and monitoring systems may weigh as much as 100 kg. They can pose a serious threat of potential back injury for ambulance operators who must lift them from the ground surface to an ambulance floor or vice versa. A need has therefore been recognized for an apparatus to assist ambulance operators in handling such loads. The present invention addresses the problem of moving transport incubators or other wheeled hospital patient conveyances to or from an ambulance, loading dock, or similar raised surface without arduous manual lifting.

BRIEF SUMMARY OF THE INVENTION

It is an object of the present invention to provide an apparatus for handling transport incubators and elevating same to or from raised surfaces.

It is a further object of the present invention to provide an apparatus which will securely support a transport incubator during transport and elevation.

The present invention provides a wheeled carrier having a hoistable elevator platform which securely supports a transport incubator during movement to and from an ambulance, obviating arduous manual lifting. The carrier includes a wheeled undercarriage which supports a hoistable elevator platform. The undercarriage and the elevator platform are interconnected by an opposing pair of cross-linked X-shaped lazy tongs which are interconnected with a cross member that is connected to the ram of a hydraulic cylinder. The hydraulic cylinder pump is powered by a foot pedal which projects beyond the rear of the carrier. The elevator platform may be raised by repeated strokes of the foot pedal and lowered by manipulation of a hydraulic pressure release lever which is also located at the rear of the carrier. The elevator platform is provided with a centrally located longitudinal, hollow box structure which serves as a loading guide and locking mechanism to ensure that the transport incubator is properly positioned on the elevator platform during loading and that it is securely locked in place once loaded.

The carrier may of course be adapted for use with practically any wheeled patient conveyance, including wheelchairs, wheeled stretchers, wheeled patient trolleys and the like.

In more general terms, the present invention includes a carrier for handling wheeled patient conveyances, said carrier comprising:

a wheeled undercarriage;

a platform hoistably mounted to said undercarriage for supporting said wheeled patient conveyance, said platform being vertically displaceable above said undercarriage while remaining substantially parallel therewith;

means for hoisting said platform;

means for releasably locking said wheeled patient conveyance to said platform: and break means for selectively inhibiting the relative movement of said wheeled undercarriage.

BRIEF DESCRIPTION OF THE DRAWINGS

The invention will now be explained by way of example only and with reference to the following drawings wherein:

FIG. 5 illustrates the transport incubator being offloaded from the carrier of FIG. 1;

FIG. 6 is a detailed view of a preferred locking apparatus for securing a patient conveyance on the carrier of FIG. 1;

FIG. 7 is a detailed schematic view of the lock mechanism illustrated in FIG. 6.

DETAILED DESCRIPTION OF THE PREFERRED EMBODIMENTS

Figure 1:
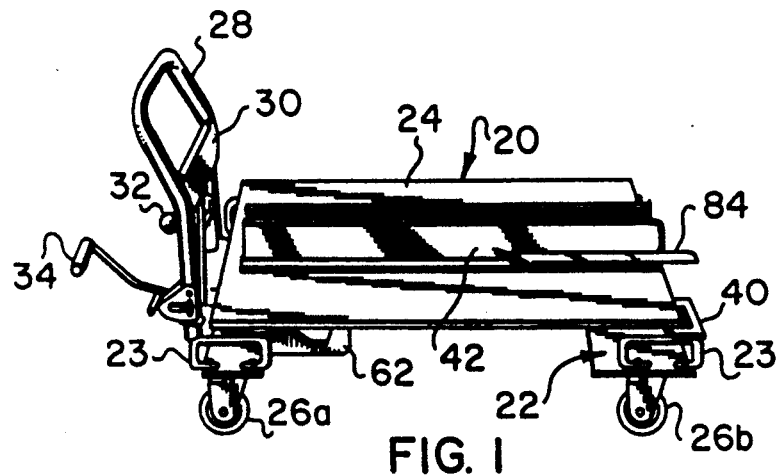
FIG. 1 is a perspective side view of a preferred embodiment of a carrier for transport incubators.
Figure 2:
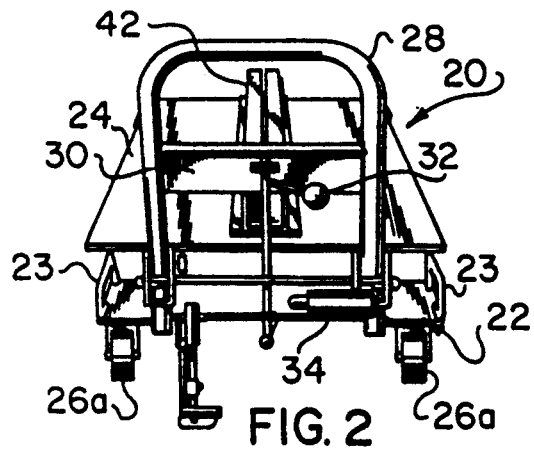
FIG. 2 is a rear perspective view of the carrier of FIG. 1.
Figure 3:
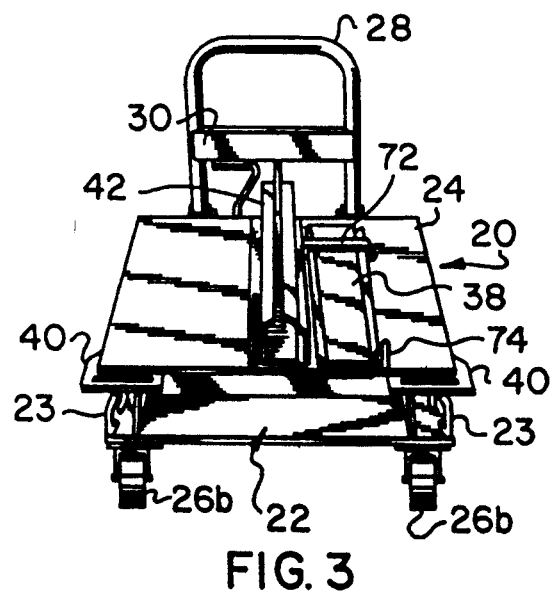
FIG. 3 is a front perspective view of the carrier of FIG. 1.

As shown in the FIGS. 1-3, a carrier in accordance with the invention is generally indicated by the reference 20. The carrier includes a wheeled undercarriage 22 and an elevator platform 24. The undercarriage is provided with two sets of wheels, rear wheels 26a being of the fixed type and front wheels 26b having swivel mounts to provide steerability for the carrier. Attached to the rear of the wheeled undercarriage 22 is a handle 28 for steering and propelling the apparatus. Handle 28 is provided with a cross-member 30 which lends rigidity to the handle and provides support for the hydraulic cylinder pressure release lever 32 which projects rearward of the handle 28. Also projecting rearward of the carrier 20 is a hydraulic cylinder pump lever 34, the construction and use of which will be described in more detail hereinafter. The carrier 20 further includes a pair of detachable ramps 38 which may be connected to ramp supports 40 for embarking a transport incubator onto or off of the elevator platform 24 of the carrier. A locking mechanism 42 for immovably securing a transport incubator on the elevator platform 24 will also be described hereinafter in detail.

Figure 4:
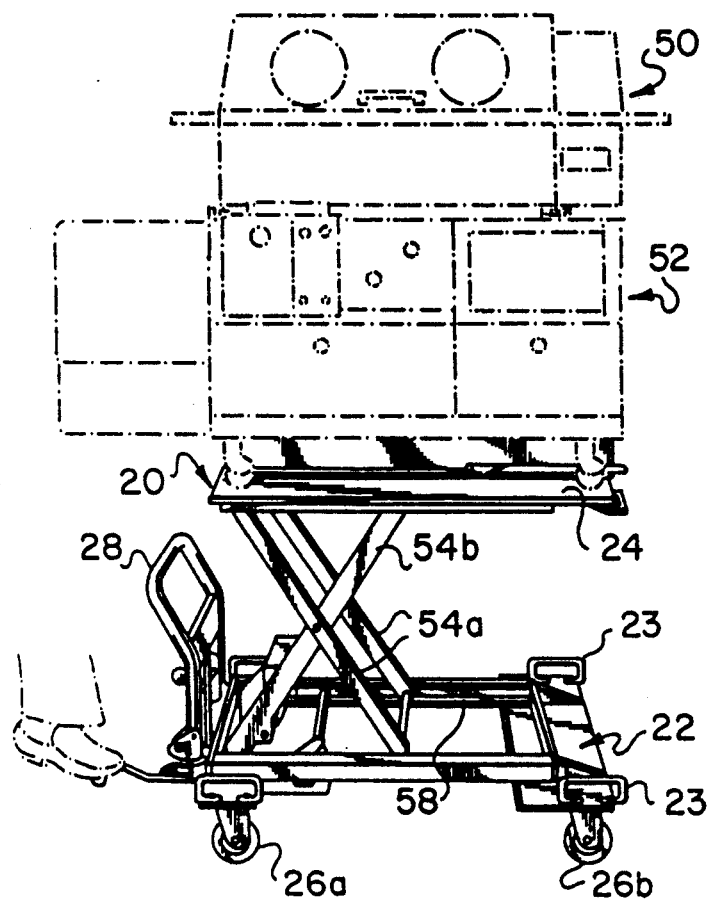
FIG. 4 is side perspective view of the carrier of FIG. 1 with its elevator platform in an elevated condition, supporting a transport incubator.

As is apparent from FIG. 4, the preferred embodiment of the invention was designed for handling transport incubators having wheeled bases which are equipped with life support and monitoring equipment. The carrier is, of course, readily adapted for use in transporting wheeled stretchers, wheelchairs and the like, the model of the carrier herein illustrated and described must be understood to be exemplary only.

A transport incubator typically includes an infant incubator, generally indicated by reference 50, and an incubator support base generally indicated by the reference 52. The incubator support base 52 is typically equipped with vital functions monitors, an oxygen supply and other and medicines as may be required for the emergency treatment of infants. The incubator in combination with its life support and monitoring base is quite heavy and therefore not easily embarked or disembarked from an ambulance. The infant's chances of survival are greatly enhanced if the infant can be transported to hospital in an incubator equipped with a life support and monitoring system such as illustrated in FIG. 4. The aforesaid difficulty with using such an incubator, as noted above, is the loading and unloading of the incubator to or from an ambulance. The use of a carrier 20 eliminates arduous manual lifting and thereby provides a safe means of manoeuvering a transport incubator to or from an ambulance or other approachable raised surfaces.

In FIG. 4, elevator platform 24 is shown in its raised condition. The elevator platform 24 is supported by lazy tongs having opposing legs 4a and 54b. Legs 54a are pivotally affixed to brackets 55a on the rear end region of elevator platform 24, and legs 54b are pivotally affixed to bracket 55b on the rear end region of the wheeled undercarriage 22 (see FIG. 4a). The respective opposite ends of each pair of legs 54a and 54b are provided with roller bearings which project laterally from the outside surface of each leg and slide in tracks 58.

Figure 4A:
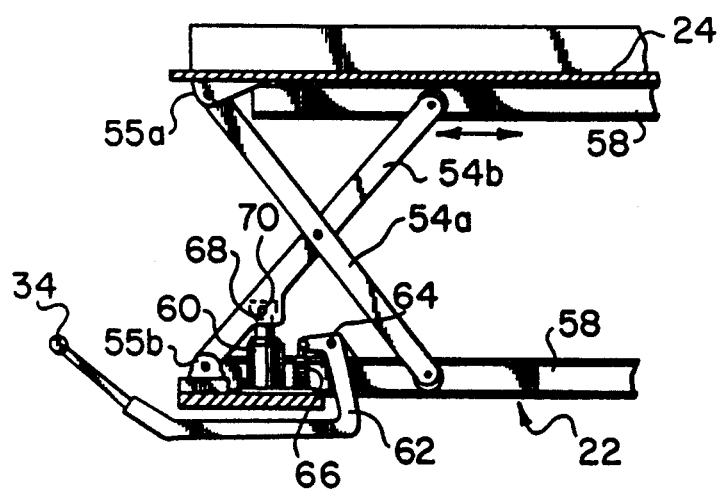
FIG. 4a is a side elevational detail of the elevator apparatus of the carrier shown in FIG. 1.

The elevator platform 24 is raised and lowered by means of a hydraulic cylinder 60 (hydraulic bottle jack, see FIG. 4a). The extension of the hydraulic cylinder ram 68 is accomplished by the actuation of a foot pedal 34 which is affixed transversely to the end of an elongated hydraulic pump rod 62. The pump rod 62 is mounted on its inboard end to a horizontal pivot 64 which is affixed to the wheeled undercarriage 22. The pressure of a coil spring 66 maintains the foot pedal 34 in a raised position ready for a pumping stroke. As is apparent from FIG. 4a, the ram 68 of hydraulic cylinder 60 is affixed to a cross member 70 which interconnects the opposing legs 54b of the pair of lazy tongs which support the elevator platform 24. When ram 68 is extended, the upper ends of legs 54b are pivoted rearwardly by the lifting pressure exerted on cross member 70. This, in turn, causes the lower ends of legs 54a to move rearwardly along their guide tracks 58. Elevator platform 24 is lowered by releasing the hydraulic pressure from hydraulic cylinder 60, which is accomplished by manipulation of the hydraulic pressure release lever 32 (see FIG. 2). The hydraulic pressure release lever 32 is attached to the pressure release screw (not illustrated-)of the cylinder 60 so that force applied to the lever in one direction closes the hydraulic pressure release screw and force applied to the lever in the opposite direction opens the hydraulic pressure release screw.

FIG. 5 illustrates the use of the ramps 38 for embarking or disembarking the transport incubator from the elevator platform 24. Ramps 38 are attached to ramp supports 40 by inserting a curved extension on their inboard ends into the slots provided in ramp supports 40. The structure of the slots in ramp supports 40 permits limited pivotal movement of ramps 38 to accommodate for any difference between the height of elevator platform 24 and the destination surface. When not in use, ramps 38 are stored on elevator platform 24 and held in place by brackets 72 at their rear ends and 74 near their front ends (see FIG. 3).

In order to ensure the security of handling a transport incubator on the carrier 20, some provision is required for detachably securing the transport incubator to elevator platform 24. In a preferred embodiment of the invention, a guide rail locking mechanism is provided for this purpose. The guide rail locking mechanism includes a centrally located slim, rectangular aluminum box structure 42, open on its front end and having a longitudinal slot 75 along its transverse midline which extends the full length of its top surface. A latch mechanism, including a rectangular strike plate 76 attached to a rotatable barrel 82, is transversely located near the open end of box structure 42 for lockingly engaging guide members 78 which are affixed to the underside of the transport incubator base 52. The guide members 78 are preferably cut from lengths of aluminum I-beam stock though other similarly shaped materials, including high strength plastics are also suitable. The guide members 78 are attached in longitudinal alignment along the midline of the undersurface of the transport incubator base 52 (see FIG. 5). The guide members 78 are mounted to the incubator base 52 so that the web of each guide member enters the slot 75 when the transport incubator is loaded onto the elevator platform 24. This ensures that the incubator is properly positioned on platform 24 and eliminates any danger of the incubator running off an edge of the platform. The bottom flange of guide members 78 prevents the guide members from being lifted out of box structure 42 and thereby prevents the transport incubator from tipping off of the elevator platform 24. The guide members 78 are locked within box structure 42 by the strike plate 76 which normally rests against the inside top surface of the box structure 42. On entering box structure 42, the leading edge of each guide member 78 contacts strike plate 76 and rotates it downwardly against the tension of a coil spring 80 which is attached to the latch mechanism release lever 84. After a guide member 78 has passed over the strike plate 76, the tension of coil spring 80 rotates strike plate 76 upwardly into contact with the angled, front face of the guide member. This securely locks the guide member within slot 75 and prevents the transport incubator from moving longitudinally on elevator platform 24. The transport incubator may be released from the elevator platform by lifting lever 84 which in turn rotates strike plate 76 downward to permit the guide members 78 to pass over the top of the strike plate 76 and barrel 82.

Figure 8:
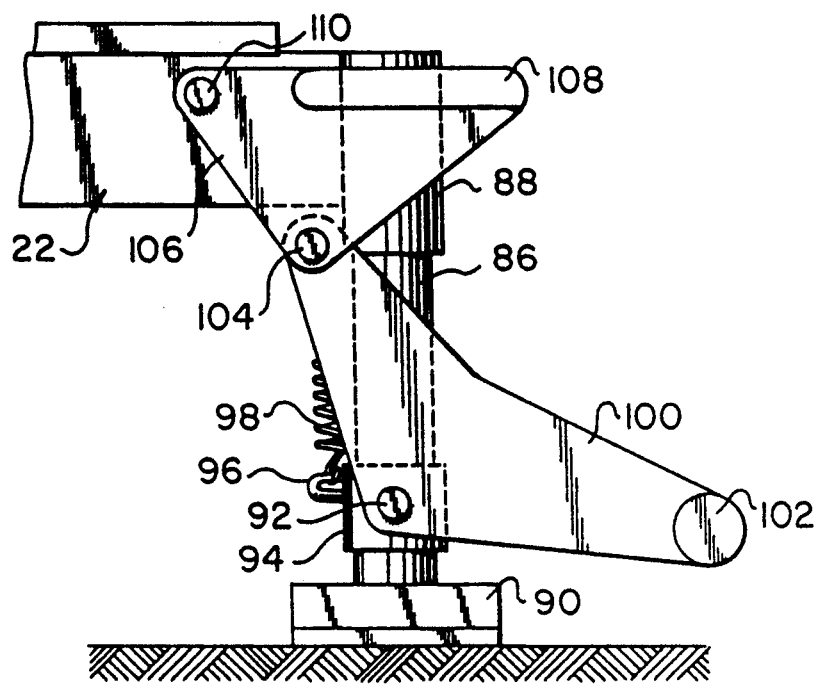
FIG. 8 is a detailed view of a preferred brake mechanism for the carried illustrated in FIG. 1.

To prevent the carrier 20 from moving during a loading or unloading operation or while unattended, a reliable brake mechanism is required. A brake mechanism is therefore provided for selectively inhibiting the movement of the carrier 20 whenever circumstances warrant. The brake mechanism illustrated in FIG. 8 is designed to force a rubber faced brake pad onto a flat surface with adequate force to prevent the carrier 20 from rolling. Although wheel brakes may be utilized for the same purpose, they are considered to be too unreliable for acceptably safe operation.

The break mechanism includes a steel shaft 86 slidably mounted in a cylindrical sleeve 88 which is welded to the frame of the wheeled undercarriage 22. The lower end of the vertically displaceable shaft 86 is provided with a rubber faced metal disk brake pad 90. A short cylindrical sleeve 94, provided with an attachment 96 for the end of a coil spring 98, is affixed to the shaft 86 above brake pad 90 by a pin 92 which also pivotally supports a brake lever 100. The brake lever 100 is elongated and substantially triangular in shape. It is pivotally attached on its inner end by a pin 104 to the lower corner of a triangular brake lock/release lever 106. The brake lock/release lever 106 is provided with a brake release bar 108 attached to its top outer edge for releasing the brake. The brake lever 100 includes a horizontal rubber covered rod 102 affixed to its free end for applying the brake. The brake mechanism, as illustrated in FIG. 8, is in its applied condition. The brake is applied by the downward pressure of an operator's foot on rod 102 which forces the brake pad 90 downward into contact with the ground and rotates the brake lock 106 upwardly into its locked condition. Downward pressure on the brake release bar 108, also preferably applied with the foot, rotates the triangular brake lock downwardly about pivot pin 110 and swivels pin 104 in a rearward direction to release the brake lever 100 from its locked condition. When the brake lever 100 is released, coil spring 98 retracts the brake pad 90 from its contact with the ground and retains it in a raised condition.

Figure 9:
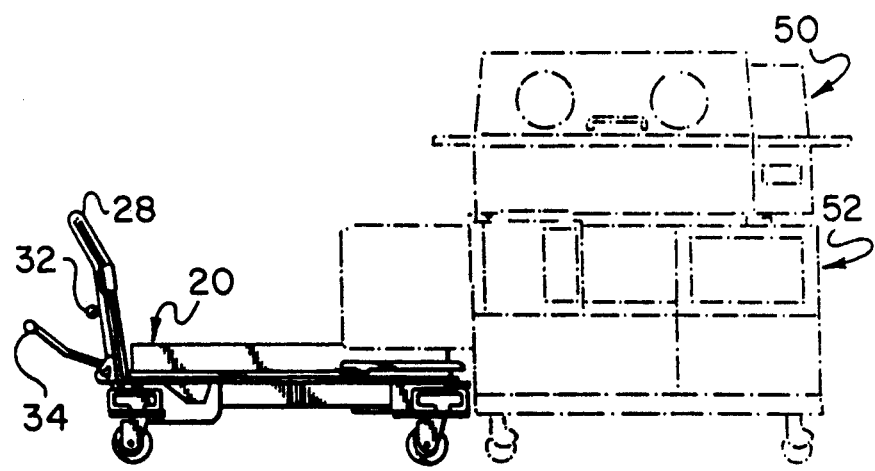
FIG. 9 illustrates a storage scheme for a transport incubator and the carrier of FIG. 1 during transport in an ambulance.

The carrier in accordance with the preferred embodiment of the invention is used as follows. When a transport incubator is required for transporting an infant, the carrier brake mechanism is set and the incubator is loaded onto the carrier by means of ramps 38 from any raised surface. Normally, incubators are provided with a carrier and remain on the carrier at all times except during transport in an ambulance as will be explained below. When a transport incubator is required for transporting an infant to hospital, carrier 20 maneuvered to the rear of an ambulance where the brake mechanism is set and the elevator platform 24 is raised by repeated strokes of the foot pedal 34 to the approximate height of the ambulance floor. If required, ramps 38 are then connected to the ramp supports 40 and rested on the ambulance floor. Many modern ambulances may be approached closely enough that ramps are not required for disembarking a transport incubator from the elevator platform 24 to an ambulance floor. The latch mechanism release lever 84 is raised to release the transport incubator from the elevator platform 24 and the transport incubator is rolled into the ambulance. The ramps 38, if required, are removed and replaced in their holding brackets, the elevator platform 24 is lowered and carrier 20 is then easily loaded into the ambulance by two people positioned on opposite sides of it. Lifting the carrier 20 is facilitated by the handles 23 which are provided expressly for that purpose. As shown in FIG. 9, the transport incubator and the carrier are stored end to end in an ambulance and are secured in position by the standard attachments for stretchers provided in most ambulances. The unloading operation is accomplished in the reverse of the sequence outlined above.

Changes and modifications in the specifically described embodiments can be carried out without departing from the scope of the invention which is intended to be limited only by the scope of the appended claims.

I claim:

1. A carrier for handling hospital patient conveyances provided with wheeled bases, said carrier comprising:
   a wheeled undercarriage;
   a platform hoistably mounted to said undercarriage for supporting the wheeled base of said patient conveyance, said platform being vertically displaceable above said undercarriage while remaining substantially parallel therewith;
   means for hoisting said platform;
   means for releasably locking said patient conveyance to said platform;
   ramp means for embarking and disembarking said patient conveyance from said platform; and
   brake means for selectively inhibiting movement of said wheeled undercarriage relative to a support surface;
   said means for releasably locking a wheeled patient conveyance to said platform including an elongated box structure open on one end and provided with a top surface of predetermined length and a narrow elongated longitudinal slot centered along said length of said top surface, said to surface having an inside;
   a latch mechanism transversely located within said box structure near said open end, said latch mechanism including a strike plate having a top edge and two ends and being affixed to a rotatable barrel having two ends and provided on one of said ends with a lever located along an outer side of said box structure, said lever being biased by a spring which urges said lever to a locked position wherein said top edge of said strike plate rests against said inside of said top surface of said box structure; and
   guide members comprising short sections of I-beam shaped stock each having a central web and being attached to the longitudinal centerline of the underside of said patient conveyance so that said web of each of said guide members enters said slot in said box structure when said patient conveyance is embarked on said platform, and said guide members are lockingly retained within said box structure by said latch mechanism.

2. A carrier for handling an infant transport incubator comprising:
   a wheeled undercarriage provided on one end with a handle for steering and propelling said undercarriage;
   a platform hoistably mounted to said undercarriage by a pair of opposing cross-linked lazy tongs;
   said platform and wheeled undercarriage each having a top, an underside, and longitudinal edge regions adjacent ends which correspond with one another; each of said lazy tongs including two legs having two ends which are respectively pivotally attached on one of their ends to said longitudinal edge regions of said corresponding ends of said platform and said wheeled undercarriage, and provided on the other of their ends with laterally projecting bearings which ride in tracks affixed to each respective longitudinal edge region of said underside of said platform and said top of said wheeled undercarriage; said lazy tongs being further provided with an interconnecting cross member for receiving lifting pressure from a hydraulic ram of a hydraulic cylinder affixed to said wheeled undercarriage;
   an elongated box structure open on one end and provided with a top surface of predetermined length and a narrow elongated longitudinal slot centered along said length of said top surface, said top surface having an inside;

a latch mechanism transversely located within said box structure near said open end, said latch mechanism including a strike plate having a top edge and two ends and being affixed to a rotatable barrel having two ends and provided on one of said ends with a lever located along an outer side of said box structure, said lever being biased by a spring which urges said lever to a locked position wherein said top edge of said strike plate rests against said inside of said top surface of said box structure;

guide members comprising short sections of I-beam shaped stock each having a central web and being attached to the longitudinal centerline of the underside of said transport incubator so that said web of each of said guide members enters the slot in said box structure when said transport incubator is embarked on said platform, and said guide members are lockingly retained within said box structure by said latch mechanism;

an elongated, substantially triangular brake lever having a central apex, an inner end and a free end and being pivotally mounted on said central apex to a vertically displaceable shaft, said shaft having a lower end and a brake pad affixed to said lower end;

a substantially triangular brake lock lever having a lower corner, an adjacent corner, and a free corner;

said brake lever being pivotally mounted on said inner end to said lower corner of said substantially triangular brake lock lever, and said brake lever being provided on said free end with a pressure rod for applying said brake;

said brake lock lever being pivotally connected on said adjacent corner to a horizontal pivot and provided on said free corner with a brake release bar; and spring means interconnecting said wheeled undercarriage and said vertically displaceable shaft for urging said brake rod to a released condition.

3. A method of handling hospital patient conveyances equipped with wheeled bases, said method comprising:
providing a carrier for said patient conveyances, said carrier including at least a wheeled undercarriage, a platform hoistably mounted to said undercarriage, a selectively releasable lock mechanism for securing said hospital patient conveyance on said carrier, and brake means for selectively inhibiting the relative movement of the carrier; and (a) maneuvering said carrier to a position adjacent the rear doors of an ambulance having a floor located at a predetermined level;

(b) locking said brake mechanism, hoisting said platform to the approximate level of said ambulance floor, releasing said lock mechanism, optionally positioning ramps between said platform and said ambulance floor, and disembarking said wheeled patient conveyance to said ambulance;

(c) lowering said platform and loading said carrier into said ambulance; and on arrival at a destination (d) removing said carrier from said ambulance, locking said brake mechanism, hoisting said platform to the approximate level of said ambulance floor, optionally positioning said ramps between said platform and said ambulance floor, embarking said wheeled patient conveyance on said platform, lowering said platform, to its normal position for moving said wheeled patient conveyance.

4. A carrier for handling hospital patient conveyances provided with wheeled bases, said carrier comprising:
a wheeled undercarriage;

a platform hoistably mounted to said undercarriage for supporting the wheeled base of said patient conveyance, said platform being vertically displaceable above said undercarriage while remaining substantially parallel therewith;

means for hoisting said platform;

means for releasably locking said patient conveyance to said platform;

ramp means for embarking and disembarking said patient conveyance from said platform; and brake means for selectively inhibiting movement of said wheeled undercarriage relative to a support surface;

said means for releasably locking a wheeled patient conveyance to said platform including an elongated box structure open on one end and provided with a top surface of predetermined length and a narrow elongated longitudinal slot centered along said length of said top surface, said top surface having an inside;

a latch mechanism transversely located within said box structure near said open end, said latch mechanism including a strike plate having a top edge and two ends and being affixed to a rotatable barrel having two ends and provided on one of said ends with a lever located along an outer side of said box structure, said lever being biased by a spring which urges said lever to a locked position wherein said top edge of said strike plate rests against said inside of said top surface of said box structure; and guide members comprising short sections of I-beam shaped stock each having a central web and being attached to the longitudinal centerline of the underside of said patient conveyance so that said web of each of said guide members enters said slot in said box structure when said patient conveyance is embarked on said platform, and said guide members are lockingly retained within said box structure by said latch mechanism.

* * * * *

UNITED STATES PATENT AND TRADEMARK OFFICE
CERTIFICATE OF CORRECTION

PATENT NO. : 5,018,931
DATED : May 28, 1991
INVENTOR(S) : Derek A. Uttley It is certified that error appears in the above-identified patent and that said Letters Patent is hereby corrected as shown below:

Column 2, line 58:

"whIch" should be --which--

Column 3, line 14:

After "other" insert --equipment--

Column 3, line 31:

"4a" should be --54a--

Column 3, lines 61 and 62:

"(not illustrated-}" should be --(not illustrated)--

Column 6, claim 1, lines 22:

"said to" should be --said top-- (second occurrence)

Signed and Sealed this

Twenty-fourth Day of November, 1992

Attest:

DOUGLAS B. COMER

*Attesting Officer*      *Acting Commissioner of Patents and Trademarks*